United States Patent [19]
Pickard et al.

[11] Patent Number: 5,454,428
[45] Date of Patent: Oct. 3, 1995

[54] HYDRONIC RADIANT HEAT DISTRIBUTION PANEL AND SYSTEM

[75] Inventors: Dale H. Pickard; Robert W. Knebel, both of Bozeman, Mont.

[73] Assignee: Radiant Engineering, Inc., Bozeman, Mont.

[21] Appl. No.: 156,098

[22] Filed: Nov. 22, 1993

[51] Int. Cl.⁶ .................................................. F24D 19/02
[52] U.S. Cl. ................... 165/49; 237/69; 165/178
[58] Field of Search ........................ 237/69; 165/56, 165/49, 171, 178

[56] References Cited

U.S. PATENT DOCUMENTS 4,338,994  7/1982  Hewing et al. ............................ 237/69
4,766,951  8/1988  Bergh ......................................... 237/69

*Primary Examiner*—Henry Bennett
*Attorney, Agent, or Firm*—Harry M. Cross, Jr.

[57] ABSTRACT

An extruded aluminum radiant heat transfer plate includes an integral elongated receptacle for holding and confining a plastic tubing. The aluminum radiant heat transfer plate is extruded to provide heat transfer side edges in the form of thin-walled fins running the length of the extrusion. Between the fins, the extrusion provides the elongated receptacle for the plastic tubing. The receptacle can take the form of a "C" (as it appears in cross section) that stands above the plane of the heat transfer fins. The receptacle, alternately, can take the form of a "U" (as it appears in cross section), the legs of which integrally connect to the fins.

7 Claims, 4 Drawing Sheets

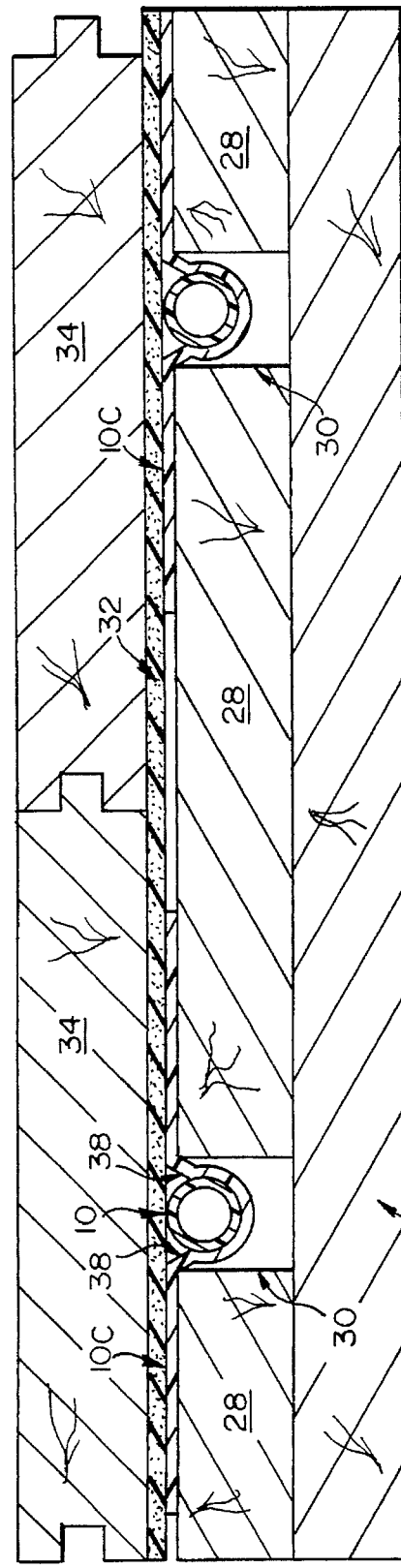

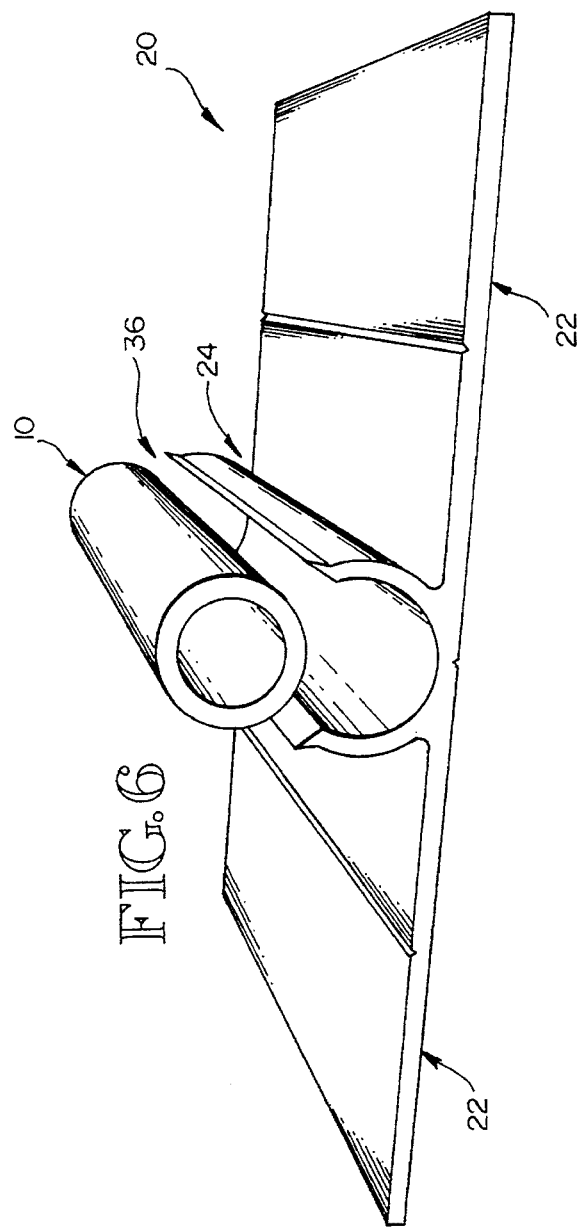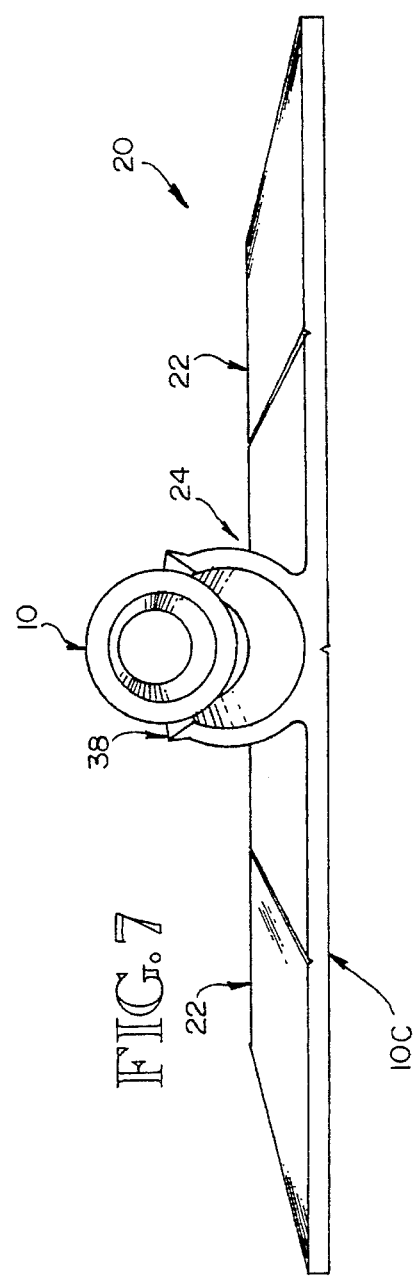

HYDRONIC RADIANT HEAT DISTRIBUTION PANEL AND SYSTEM

FIELD OF THE INVENTION

The present invention relates to hydronic floor, wall and ceiling heating systems for heating an enclosed space by circulating a heating fluid through a tubing system.

BACKGROUND OF THE INVENTION

Hydronic heating systems are well-known in the art. In a floor heating system, for example, it is known to utilize an entire floor surface to transmit a precise amount of energy necessary to heat a room by circulating warm water (or an appropriate heat transfer fluid) through plastic tubing within a floor structure that lies just below the surface. Such a floor heating system distributes heat through the floor without unsightly radiators, duct grilles or other obvious appliances. In such structures, it is known to provide a subflooring structure that incorporates aluminum sheet metal heat transfer plates that are grooved so that the plastic tubing rests within the grooves. Heating fluid, such as warm water, passes through the tubing, heating the sheet metal heat transfer plates and the heated transfer plates conduct heat from the system from the subflooring system into the floor above where it radiates into the space to be heated. Similar such systems are known for heating walls and ceilings, utilizing plastic tubing and aluminum sheet metal heat transfer plates. Radiant tubing grids and manifold layouts are installed to facilitate efficient heat transfer to the heated space.

Heretofore, copper tubing was the preferred tubing and heat transfer plates were designed for spacing and holding the copper tubing in place within the floor substructure. Current practice, however, is to use a synthetic material for the tubing, such as polyethylene or polybutylene, herein called "plastic" tubing. Plastic tubing exhibits different characteristics than copper tubing and the current practice, based on adaptations from copper tubing systems, does not fully utilize the full value of a plastic tubing and aluminum heat transfer plate system.

SUMMARY OF THE INVENTION

It is a primary object of the present invention to advance the art of hydronic radiant heating that incorporates aluminum radiant heat transfer plates and non-metallic tubing, and preferably plastic tubing. This system is adaptable to floor, wall and ceiling radiant heating systems. The combination of the present invention provides an extruded aluminum radiant heat transfer plate that includes an integral elongated receptacle for holding and confining a plastic tubing. The aluminum radiant heat transfer plate is extruded to provide heat transfer side edges in the form of thin-walled fins running the length of the extrusion. Between the fins, the extrusion provides the elongated receptacle for the plastic tubing. The receptacle can take the form of a "C" (as it appears in cross section) that stands above the plane of the heat transfer fins. The receptacle, alternately, can take the form of a "U" (as it appears in cross section), the legs of which integrally connect to the fins.

In either receptacle configuration ("C" or "U") the tubing-receiving channel is semicircular with the degree of wrap being on the order of 200° (so as to be substantially greater than 180°), and the sides of the receptacle that lead into the channel are planar and acutely-sloped from the vertical at about 30°. The sloped sides of the receptacle provide a guideway to facilitate positioning the plastic tubing longitudinally of the channel so that the tubing can be forced into the channel and locked therein.

The semicircular configuration of the receptacle channel has a diameter that is nominally the same as the outer diameter of the plastic tubing. Moreover, the extrusion has a receptacle wall thickness thick enough that the receptacle wall will not readily deform. Consequently, the plastic tubing, when it is inserted into the receptacle channel, must itself deform as it is pressed from the guideway into the channel. Because the plastic tubing is elastic, it will accept the required deformation and return to its original shape (or be forced into a round shape if it happens to have been out-of-round in the first place) when it has been snapped into place within the channel. When warm water is passed through the plastic tubing, the tubing will expand slightly and tighten its bearing against the side of the receptacle channel. In order to maintain good thermal contact between the channel wall and the tubing, the channel wall must be thick enough that it will not deform or warp as a consequence of the tubing expansion due to the passage of warm water.

Thus the invention provides a radiant heating system heat transfer module that comprises in combination an extruded aluminum heat transfer plate and a non-metallic tubing. The heat transfer plate comprises an elongated extruded aluminum member configured to provide coplanar side fins and an intermediate tubing receptacle with the side fins defining a first outer heat transfer surface and a second inner surface. The tubing receptacle extends away from the outer surface in the direction of and beyond the second surface. The tubing receptacle is configured to provide an elongated semicircular tubing-receiving space defined by an inner wall having a semicircular circumference extending through an arc of at least 180°. The tubing receptacle is also configured to provide a pair of guideway sides that extend outwardly and that diverge from one another so as to define a receptacle guideway opening into the tubing-receiving space. The tubing has an elastic generally circular wall and is confined within the receptacle and held therein by the semicircular wall thereof. The diameter of the tubing is nominally the same as the diameter of the tubing-receiving space and greater than the size of the guideway opening whereby the tubing has to be forced past the guideway sides and deformed so as to pass through the guideway into the tubing-receiving space.

In one embodiment, the tubing receptacle semicircular inner wall is "C"-shaped and has arms extending outwardly from the second inner surface and terminating in the guideway sides. In another embodiment the tubing receptacle semicircular inner wall is "U"-shaped and has arms terminating in the guideway sides, the guideway sides joining into the first inner surface and forming a transition between the tubing receptacle and the side fins.

The guideway sides diverge from one another at about 60° and the tubing receptacle semicircular inner wall has a circumference extending through an arc of about 200°.

BRIEF DESCRIPTION OF THE DRAWINGS

FIG. 4 is a cross-section view taken along the line A—A of FIG. 1 showing a floor subsystem incorporating an extruded heat transfer plate having a "U"-shaped tubing receptacle;

FIG. 5 is a cross-section view of the extruded heat transfer plate shown in FIG. 4;

FIG. 6 is view in perspective of the FIG. 3 heat transfer plate with a plastic tubing aligned in preparation for attachment to the heat transfer plate receptacle; and FIG. 7 is a view in perspective of the FIG. 6 heat transfer plate and plastic tubing arrangement showing the plastic tubing as it would appear after being oriented within the guideway of the heat transfer plate receptacle and then beginning to be forced into the tubing receiving channel of the heat transfer plate receptacle.

DETAILED DESCRIPTION OF THE INVENTION

Figure 1:
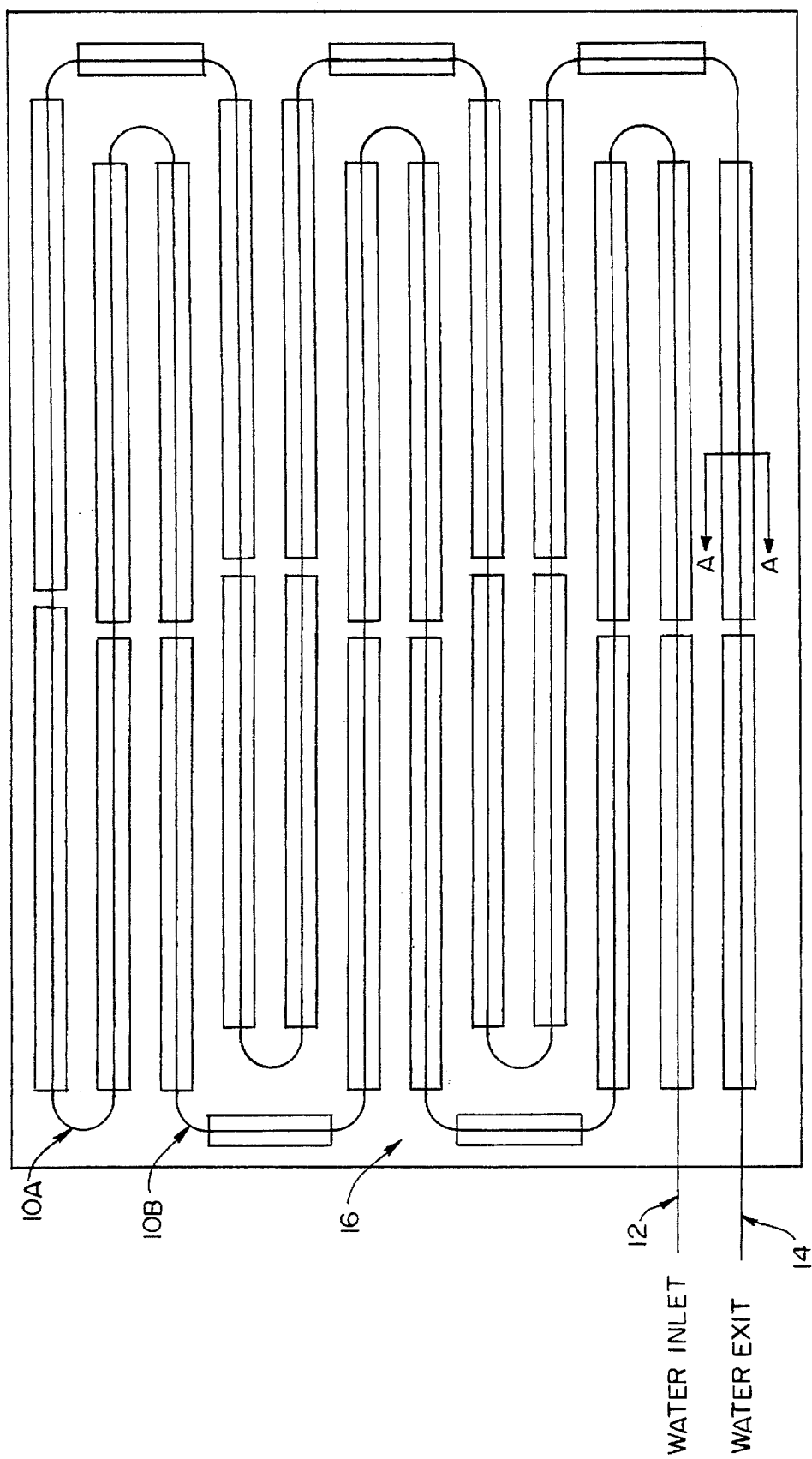
FIG. 1 is a plan view of an exemplary radiant heat transfer heating tube layout.

In a typical hydronic radiant heat transfer system, whether applied to a floor, wall or ceiling, an endless tubing 10 will be laid in place in a serpentine fashion from a heating fluid inlet 12 to a heating fluid outlet 14. The tubing 10 will be held in place by some kind of structure 16 that will include a series of heat transfer plates 20. The purpose of the heat transfer plates 20 is to distribute heat from the tubing across a greater area than is occupied by the tubing so that the consequent radiant heat is more uniformly applied across the space to be heated.

With respect to a floor radiant heating system, the tubing 10 will be positioned in parallel lines 10a, 10b, etc. spaced apart at regular intervals. Extruded aluminum heat transfer plates 20 will be positioned across the floor area in a series of parallel modules and the straight runs, or lines, 10a, 10b, etc. of tubing 10 will be fastened to the heat transfer plates 20. The extruded heat transfer plates 20 comprise integral side edges that provide side fins 22 and an integral tubing receptacle 24. In a preferred form of the extruded heat transfer plate 20, the plate consists of two integral side edges providing side fins 22 and an intermediate tubing receptacle 24, all of which form the one-piece extrusion. The side fins 22 are relatively thin-walled compared to the surrounding structure of the radiant heat transfer system. The thickness of the walls of the heat transfer plate that make up the tubing receptacle 24 are sufficiently thick that they will not deform during installation of the tubing or during operation of the heating system.

Figure 3:
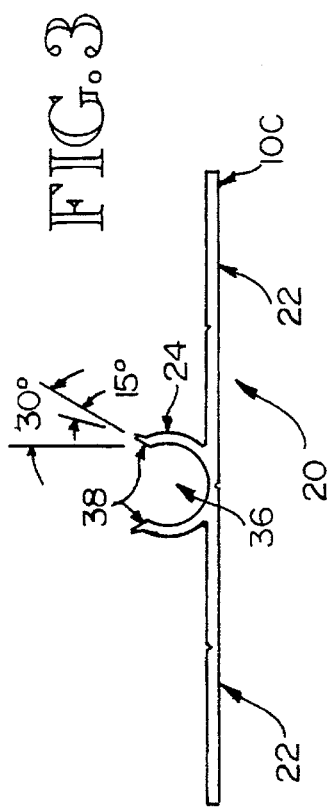
FIG. 3 is a cross-section view of the extruded heat transfer plate shown in FIG. 2.
Figure 2:
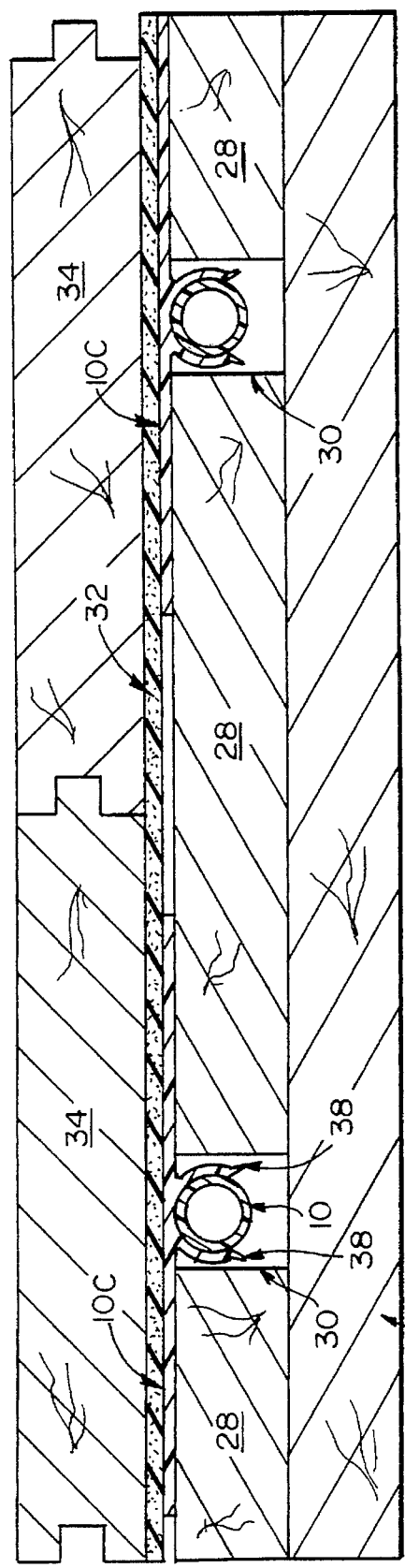
FIG. 2 is a cross-section view taken along the line A—A of FIG. 1 showing a floor subsystem incorporating an extruded heat transfer plate having a "C"-shaped tubing receptacle.

The heat transfer plate tubing receptacle 24 may be "C"-shaped (when viewed in cross-section as shown in FIGS. 2 and 3) or it may be "U"-shaped (when viewed in cross-section as shown in FIGS. 4 and 5). In either case, in a preferred flooring system a subfloor such as ¾ inch plywood 26 would be overlaid with sleepers, such as particle board segments 28, and heat transfer plates 20 would be laid over the sleepers as shown in FIGS. 2 and 4. The sleepers 28 would be spaced apart so that a gap 30 would be provided between them so that the tubing receptacles 24 of the overlying heat transfer plates 20 would depend therein. The gaps 30 are preferably wider and deeper than the width and height of the tubing receptacles that depend therein; this being conveniently provided by using sleepers 28 that are thicker than the height of the tubing receptacles and spacing the sleepers 28 further apart than the width of the tubing receptacles. In some installations, a thin foam pad 32 may be laid over the heat transfer plates as shown in FIGS. 2 and 4, and then the finished floor, such are hardwood flooring 34, would be installed.

Oftentimes a radiant heat flooring system will be added to an existing floor structure, with the original floor remaining. In such a case, the radiant system is often installed from below and the heat transfer plates 20 would be installed between the floor joists. In this type of installation, the heat transfer plates design of FIGS. 2–3 would be most suitable since these plates could be installed from below and the tubing 10 could be snapped into place within the tubing receptacles 24 from below. Of course, the heat transfer plate design of FIGS. 2–3 could also be installed from above as would be the case to produce the FIGS. 2–3 configuration. In either configuration it is preferred that the heat transfer plate 20 bear upwardly against the finished flooring for best heat transfer; a preference that requires the tubing receptacle 24 of either design to extend below the plane of the outer (or upper) surface 10c of the heat transfer plate 20, as shown in FIGS. 2 and 4.

In any other installation of these heat transfer plates 20, whether in a wall or in a ceiling, the preferred orientation is similar; i.e. the outer surface 10c would face the space to be heated and the tubing receptacle 24 would extend away from the space to be heated and toward the internal structure of the radiant heating system. Thus, if one were to imagine the structure of FIG. 2 to be comparable to a wall or a ceiling, the finished flooring 34 would be the finished wall or ceiling material (typically sheetrock or paneling) and the tubing receptacle 24 would be extended inward toward the internal wall or ceiling structure while the outer surface 10c of the heat transfer plate 10 would face the external surface material (i.e. sheetrock or paneling).

Generally speaking for flooring installation from above, and in wall and ceiling installations from within the space to be heated, the heat transfer plate design of FIGS. 4–5 would be preferred. This plate design, employing a "U"-shaped receptacle 24 is preferred because the receptacle guideway 36 opens upward (outward in the case of a wall and downward in the case of a ceiling) whereas the receptacle guideway 36 for the "C"-shaped receptacle opens downward (inward: wall; upward: ceiling). An upward-opening guideway 36 facilitates the installation of the tubing 10 inasmuch as the tubing can be simply laid along the receptacle, being positioned in the guideway 36 by the guideway sides 38; these side 38 being upwardly and outwardly sloped at oppositely-oriented acute angles from the vertical. The "U"-shaped receptacle design would also be preferred for assembly of a wall or ceiling radiant heating system where installation would be conducted from the room side rather than from the opposite side of the space to be heated.

In an actual installation, the heat transfer plates 20 would be secured to the subflooring system, as by being nailed or screwed to sleepers 28. If the heat transfer plates 20 are provided with integral legs that space their receptacles away from and out of contact with the under structure represented by plywood subflooring 26, then an intermediate structure such as sleepers 28 could be avoided; in which case the plates 20 would be secured to the base subflooring directly. In any event, the heat transfer plates 20 are secured to some base. Then the tubing 10 is laid out and snapped into the heat transfer plate receptacles. In a typical installation, the heat transfer plates would be provided in lengths from about 6 feet to about 24 feet in length and widths of from about 4 inches to about six inches. The extruded plates would be sawn to the required length and a given required line could be comprised of two or more lengths of plate abutted end-to-end. At each end of a line 10a, 10b (see FIG. 1) of tubing, the endless tubing would be bent around to commence the next adjacent line. Often, as the tubing is laid out from line to line, it would be snapped in place in one line, then laid out along an adjacent line, and then snapped in place, and so forth. In other situations, the tubing could be laid out completely in a generally serpentine fashion, and then the tubing would be snapped in place progressively from line to line. In most installations, the heat transfer plate would have a width of about 4 inches, the plate thickness would be between about 0.078 to 0.015 inches, and the wall thickness of the tubing receptacle would be at least about 0.060 inches (preferably about 0.062 inches). Because of the thickness of the plate tubing receptacle 24, the tubing will be rigidly held in place; preventing the tubing from working against the receptacle when the tubing expands and contracts during use. For use with plastic tubing such as polyethylene or polybutylene, the plate 20 and tubing 10 will expand and contract at about the same rates, thus eliminating the possibility of the tubing becoming abraded by the aluminum plate 20.

Whereas it has been typical in prior art systems using sheet metal heat transfer plates to apply a significant volume of silicone caulking to fill the spaces between the tubing and the supporting heat transfer plate grooves, this is not necessary in the system of the present invention. In the typical prior art system, the absence of a significant amount of caulking will result in a deterioration in the heat transfer characteristics of the system due to convection across the gap between the tubing and the wall of the heat transfer plate groove. However, the typical gap between the inner surface of the receptacle channel and the exterior of the plastic tubing in the present invention, will be on the order of about 0.010 inches or less. This small gap disappears with expansion of the plastic tube and will not have a deleterious effect of the heat transfer characteristics between the tubing and the channel wall. If desired, this small gap may be filled with a minor amount of sealant before the plastic tubing is snapped into place to bond the tubing in place, but the majority of even a minor amount will be forced out when the plastic tubing is seated in the tubing receptacle; and in this environment the small residual amount of sealant would not serve to bridge a gap that would have otherwise degraded the heat transfer abilities of the system. The principal mode of heat transfer between the tubing and the channel wall in the present invention remains one of conductance and not convection.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. A radiant heating system heat transfer module comprising in combination an extruded aluminum heat transfer plate and a non-metallic tubing, said heat transfer plate comprising an elongated extruded aluminum member configured to provide elongated coplanar side fins and an intermediate elongated tubing receptacle with said side fins defining a first outer heat transfer surface and a second inner surface with said tubing receptacle extending away from said outer surface in the direction of and beyond said second surface; said tubing receptacle being configured to provide an elongated semicircular tubing-receiving space defined by an inner wall having a semicircular circumference extending through an arc greater than 180°, and said tubing receptacle being configured to provide a pair of elongated guideway sides that extend outwardly and that diverge from one another on each side of said inner wall so as to define an elongated convergent receptacle guideway opening into said tubing-receiving space; said inner wall and said guideway sides being substantially non-deformable; said tubing having an elastic generally circular wall and being confined within said receptacle and held therein by the semicircular wall thereof, the diameter of said tubing being nominally the same as the diameter of said tubing-receiving space and greater than the size of said guideway opening so that said tubing had to be placed on said guideway sides for orientation with respect to said guideway opening and forced past said guideway sides and deformed so as to pass through said guideway opening into said tubing-receiving space whereby said tubing is confined within said tubing-receiving space in close proximity to said inner wall for permitting heat transfer to be effected between said tubing and said inner wall essentially by conduction.

2. The combination of claim 1 wherein said guideway sides diverge from one another at about 60°.

3. The combination of claim 1 wherein said tubing receptacle semicircular inner wall has a circumference extending through an arc of about 200°.

4. The combination of claim 1 wherein said tubing receptacle semicircular inner wall is "C"-shaped with said inner wall having two projecting individual arms extending outwardly from said second inner surface with each arm being configured at its outermost end to provide one of said guideway sides.

5. The combination of claim 1 wherein said tubing receptacle semicircular inner wall is "U"-shaped with said guideway sides being contiguous with said side fins and with said inner wall so that said guideway sides provide transitions from said side fins to said inner wall in addition to providing said elongated convergent receptacle guideway opening into said tubing-receiving space its arms terminating in said guideway sides, said guideway sides joining into said first inner surface and forming a transition between said tubing receptacle and said side fins.

6. The combination of claim 4 wherein said guideway sides diverge from one another at about 60° and wherein said tubing receptacle semicircular inner wall has a circumference extending through an arc of about 200°.

7. The combination of claim 5 wherein said guideway sides diverge from one another at about 60° and wherein said tubing receptacle semicircular inner wall has a circumference extending through an arc of about 200°.

* * * * *